(12) United States Patent
Vahabzadeh

(10) Patent No.: US 8,371,734 B2
(45) Date of Patent: Feb. 12, 2013

(54) FRONT LIT ALTERABLE DISPLAY

(75) Inventor: Mahyar Vahabzadeh, Scottsdale, AZ (US)

(73) Assignee: Rogers Corporation, Rogers, CT (US)

( * ) Notice: Subject to any disclaimer, the term of this patent is extended or adjusted under 35 U.S.C. 154(b) by 334 days.

(21) Appl. No.: 12/924,011

(22) Filed: Sep. 17, 2010

(65) Prior Publication Data

US 2012/0069596 A1 Mar. 22, 2012

(51) Int. Cl.
*F21V 8/00* (2006.01)
(52) U.S. Cl. ........ 362/603; 362/621; 362/608; 362/612; 362/615; 362/628
(58) Field of Classification Search .................. 362/603, 362/608, 612, 615, 621, 628
See application file for complete search history.

(56) References Cited

U.S. PATENT DOCUMENTS

| | | | |
|---|---|---|---|
| 3,027,669 A | 4/1962 | Hardesty | 40/546 |
| 3,356,839 A | 12/1967 | Mehess et al. | 362/604 |
| 3,892,959 A | 7/1975 | Pulles | 362/613 |
| 3,998,525 A | 12/1976 | Giglia | 359/275 |
| 4,177,501 A | 12/1979 | Karlin | 362/26 |
| 4,214,820 A * | 7/1980 | Leibowitz et al. | 359/275 |
| 4,247,747 A | 1/1981 | Swatten | 200/314 |
| 5,876,107 A * | 3/1999 | Parker et al. | 362/600 |
| 5,975,711 A | 11/1999 | Parker et al. | 362/24 |
| 8,128,267 B2 * | 3/2012 | Sormani et al. | 362/555 |

* cited by examiner

*Primary Examiner* — Stephen F Husar
*Assistant Examiner* — James Cranson, Jr.
(74) *Attorney, Agent, or Firm* — Cantor Colburn LLP

(57) ABSTRACT

A tab is cut into a sheet of transparent material. The tab has a free end and a fixed end. A source of light is attached to the tab and the tab and the sheet are displaced along the z-axis of the sheet to direct light from the source into an edge of the sheet. The tab can include conductive traces for electrical connection to the light source or other electrical devices on the sheet. A variable display device adjacent the sheet is viewed through the sheet and the sheet with attached light source provides front lighting for the variable display device.

10 Claims, 1 Drawing Sheet

FRONT LIT ALTERABLE DISPLAY

FIELD OF THE INVENTION

This invention relates to a front lit, alterable display and, in particular, to a light guide for front lighting the display.

BACKGROUND OF THE INVENTION

Edge lit sheets have long been known in the art; e.g. U.S. Pat. No. 3,027,669 (Hardesty) and U.S. Pat. No. 3,356,839 (Mehess et al.). Edge lit keypads are also known in the art. For example, U.S. Pat. No. 3,892,959 (Pulles) discloses peripheral cavities for receiving light emitting diodes (LEDs); U.S. Pat. No. 4,177,501 (Karlin) discloses peripheral cavities for receiving light sources; U.S. Pat. No. 4,247,747 (Swatten) discloses LEDs optically coupled to a polyester sheet having a thickness of seven mils (0.18 mm); and U.S. Pat. No. 5,975,711 (Parker et al.) discloses a light conductive panel coupled to a light source.

U.S. Pat. No. 3,998,525 (Giglia) discloses a front lit electrochromic display, wherein the display is on the "back" side of a glass substrate (the side opposite the viewing side). Light is directed into an edge of the substrate. Several sources of light are disclosed.

As used herein, "transparent" does not imply a particular level of light transmission. The amount of light transmission that is suitable depends, among other factors, upon the thickness of the light guide. "Transparent" does imply a sufficient clarity that an image, such as text, is legible or recognizable when viewed through the light guide.

As used herein, "deform" and its cognates are generic to elastic deformation, wherein an article springs back into its original shape when stress is removed, and to plastic deformation, wherein an article is permanently changed in shape.

As portable electronic devices become more common, they are also becoming thinner, which places a premium on reducing the thickness of components. A substrate, light guide, light source, power source, electronics, and display all have finite thicknesses, herein referring to a measurement along the z-axis. The length and width of a device, measured along the x-axis and the y-axis, can have any desired dimension, typically fitting within a pocket on ones clothes. Thickness is typically considerably smaller than the other two dimensions and the desire is for the thickness to be even smaller.

In view of the foregoing, it is therefore an object of the invention to provide a light guide having an integral light source.

It is another object of the invention to provide a light guide having an integral light source, wherein the light guide is also a substrate for conductive traces interconnecting electrical devices.

SUMMARY OF THE INVENTION

The foregoing objects are achieved by this invention in which a tab is cut into a sheet of transparent material. The tab has a free end and a fixed end. A source of light is attached to the tab and the tab and the sheet are displaced along the z-axis of the sheet to direct light from the source into an edge of the sheet. The tab can include conductive traces for electrical connection to the light source or other electrical devices on the sheet. A variable display device adjacent the sheet is viewed through the sheet and the sheet with attached light source provides front lighting for the variable display device.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
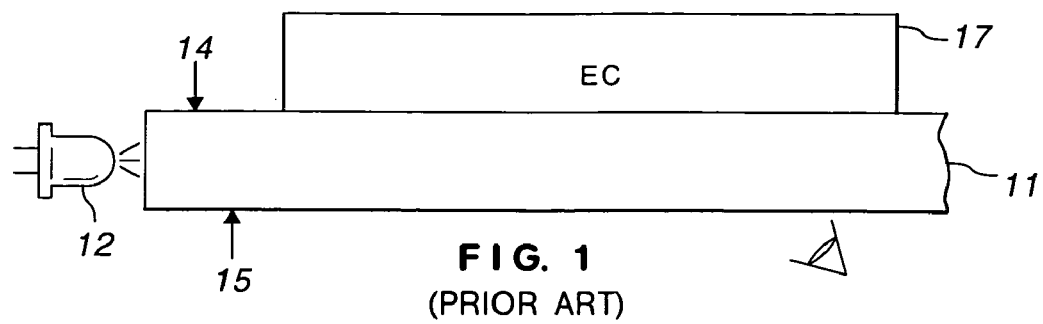
FIG. 1 illustrates an edge lit light guide constructed in accordance with the prior art.

In FIG. 1, light guide 11 is a sheet of flexible, transparent material, such as polycarbonate approximately 0.18 mm (7 mil) thick. Light from source 12 radiates into at least one edge of light guide 11 and is transmitted through the light guide, primarily by total internal reflection. LEDs (light emitting diodes), fluorescent lamps, and other devices have been used as a source of light.

Light extracting features (not shown) on major surface 14 or major surface 15, or both, are used to couple light out of the light guide through a major surface. Electrochromic display 17 on major surface 14 is illuminated by light from guide 11 and viewed from the opposite side, through major surface 15. Electrochromic display 17 has a reflective rear surface that enables the information being displayed to be seen.

Figure 2:
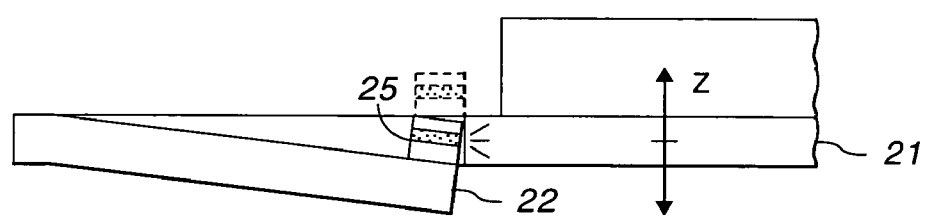
FIG. 2 is a cross-sectional view of a light guide illuminated in accordance with a preferred embodiment of the invention.

FIG. 2 illustrates a light guide having an integral source of light constructed in accordance with one embodiment of the invention. A portion of sheet 21 is partially cut, forming tab 22 which is attached at one end to sheet 21, forming a cantilever having a free end and a fixed end. Sheet 21 is preferably polyester, although other materials such as PET (polyethylene terephthalate) and polycarbonate can be used as well. PET does not need light extracting features because the film itself contains diffusing particles and has a slight haze when side lit and viewed against a dark background.

Sheet 21 is sufficiently flexible that tab 22 can be displaced along the z-axis. The displacement need not be large, only enough to allow light from LED 25 to be directed into sheet 21. Displacement is relative; i.e., one could consider that sheet 21 is displaced instead. Depending upon the size of the display, more than one LED can be used, on individual tabs or sharing the same tab. Side emitting LEDs are preferred and many commercially available side emitting LEDs are less than 1 mm. thick. Thus, displacement is on the order of 0.5 mm or less at the location of the LED.

Figure 3:
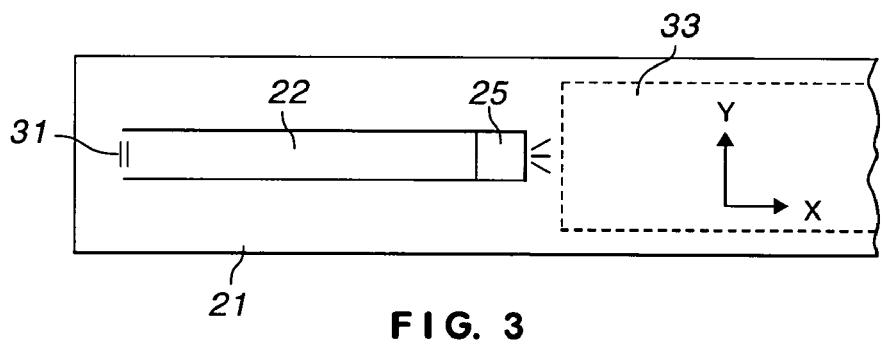
FIG. 3 is a plan view of the embodiment of FIG. 2.

FIG. 3 is a plan view of the embodiment of FIG. 2. Fixed end 31 of tab 22 is sufficiently far from LED 25 that sheet 21 does not need to deflect very much at the fixed end; i.e., the radius of curvature can be large relative to the thickness of the sheet. As illustrated in FIG. 2, display 33 is located underneath sheet 21 and is viewed through sheet 21 (looking into the plane of the drawing). Display 33 need not be electrochromic. Other types of displays having a reflective rear surface can used instead, e.g. liquid crystal displays and electrophoretic displays.

Figure 4:
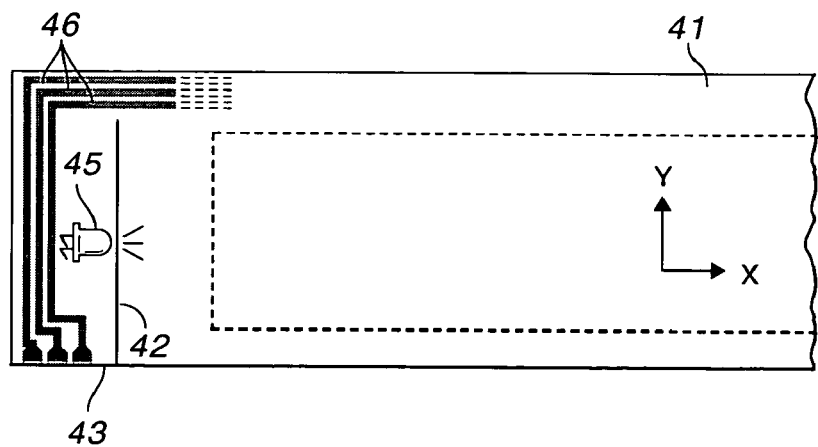
FIG. 4 is a plan view of an alternative embodiment of the invention.

As shown in FIG. 3, tab 22 is surrounded by sheet 21, LED 25 is at the free end of the tab, and the light is emitted along the long dimension of the tab. As illustrated in FIG. 4, none of these details is critical to the invention. Sheet 41 is cut at line 42 to form tab 43. Tab 43 serves as a support for light source 45 and as a substrate for supporting conductive traces 46. The conductive traces can be applied, for example, by screen printing a conductive ink or by thermally transferring foil onto sheet 41. The conductive traces interconnect light source 45 with other electronics (not shown) that are mounted on one or both major surfaces of sheet 41.

As in the embodiment of FIG. 3, tab 43 is displaced to bring light source 45 adjacent to the now-exposed cut edge of sheet 41. Tab 43 can be curved or displaced further to provide clearance for a connector on the ends of conductive traces 46. Alternatively, tab 43 can be trimmed to provide clearance for a connector with the end of tab 43 approximately aligned with the remainder of sheet 41 (tab 43 is depressed in the area of light source 45). Thus, sheet 41 acts as a light guide and a flexible printed circuit, thereby eliminating at least one layer of material from the thickness of a display.

The invention thus provides a light guide having an integral light source; i.e., the source is attached to the light guide, the light guide is cut to provide an exposed edge for directing light from the source into the light guide, and the light guide is deformed to position the source adjacent an edge. The light guide is also a substrate for conductive traces interconnecting electrical devices, which can also be located on either major surface of the light guide, or on both major surfaces.

Having thus described the invention, it will be apparent to those of skill in the art that various modifications can be made within the scope of the invention. For example, the material for the light guide is not critical. Many suitable materials are known in the art, as indicated by the prior art above. Other suitable materials may be found. The material need be transparent and flexible. Even a thin sheet of glass is flexible. Plastic deformation can provide a tab that is substantially parallel to the plane of the rest of the light guide; that is, the point of attachment has an S-curve in it.

What is claimed is:

1. A light guide having an integral source of light, said light guide comprising:
   a sheet of flexible, transparent material;
   a tab cut into said sheet, said tab having a free end and a fixed end; and
   source of light attached to said tab;
   wherein said tab and said sheet are displaced along z-axis of said sheet to direct light from said source into an edge of said sheet.

2. The light guide as set forth in claim 1 wherein said tab includes conductive traces.

3. The light guide as set forth in claim 1 wherein said light source includes at least one side emitting light emitting diode.

4. The light guide as set forth in claim 1 wherein said tab is surrounded by said sheet.

5. The light guide as set forth in claim 1 wherein said source of light is located between said free end and said fixed end.

6. A front lit display comprising:
   a transparent substrate including a tab having a free end and a fixed end;
   a variable display device adjacent said substrate and viewed through said substrate;
   at least one source of light attached to said tab;
   wherein said tab and said substrate are displaced along z-axis of said substrate to direct light from said source into an edge of said substrate, thereby providing front lighting for said variable display device.

7. The display as set forth in claim 6 wherein said tab includes conductive traces.

8. The display as set forth in claim 6 wherein said light source includes at least one side emitting light emitting diode.

9. The display as set forth in claim 6 wherein said tab is surrounded by said substrate.

10. The display as set forth in claim 6 wherein said source of light is located between said free end and said fixed end.

* * * * *